Patented Jan. 15, 1946

2,392,945

UNITED STATES PATENT OFFICE 2,392,945

ROSIN ALKYLATION

Donald Price, New York, N. Y., assignor to National Oil Products Company, Harrison, N. J., a corporation of New Jersey No Drawing. Application September 30, 1942, Serial No. 460,233

12 Claims. (Cl. 260—97)

This invention relates to a process for condensing rosin and like substances with alkyl-yielding compounds, and particularly to such a process in which the condensation is promoted by means of hydrosilicate catalysts.

It has been proposed in the applications of Price and May, Serial Nos. 410,778 and 410,779, filed September 13, 1941, now U. S. Patents 2,376,381 and 2,376,382, respectively, to condense rosin and analogous substances with alkyl-yielding compounds. The resulting condensation products may be used for many purposes, for instance, as additives to lubricants, as plasticizers or, when sulfonated, as surface-active agents and the like. The above-mentioned applications describe the condensation of these materials by the use of condensing agents such as sulfuric acid, oleum and Friedel-Crafts catalysts. These procedures are somewhat expensive and troublesome in that the reagents used as condensing agents are lost in the process, large quantities of corrosive fumes are evolved and the reactions must be conducted in corrosion-proof vessels. Likewise, when sulfuric acid or its derivatives are used as condensing agents, it is impossible to avoid the formation of sulfonated products, which are undesirable for many purposes.

Accordingly, it is an object of this invention to provide an improved process for condensing rosin with alkyl-yielding substances which may be cheaply and easily carried out.

Another object is to provide such a process in which the catalyst used to promote the reaction is recovered without substantial loss.

Still another object is to provide a condensation process of this type which will not involve the use of corrosive chemicals or the development of noxious fumes.

A further object is to provide a condensation process which will avoid any sulfonation or other adverse chemical action upon the compound being produced.

Still another object is to provide a process which may be carried out in a continuous manner.

The above and other objects are achieved in accordance with this invention by reacting a rosin compound (such as methyl abietate) with an alkyl-yielding agent (such as lauryl alcohol) in the presence of a hydrosilicate catalyst at moderately elevated temperatures. The reaction mixture, which may be separated from the catalyst by decantation or filtration, consists of condensation products of the rosin compound with the alkyl-yielding agent, together with the unreacted constituents. The condensation product may be separated from this mixture by any suitable means, for instance by distillation. The condensation product so isolated may be used as such for any appropriate purpose or may be further treated as by sulfonation, nitration, hydrogenation, or the like.

Hydrosilicate catalysts suitable for use in this process include any hydrosilicate having a large capillary surface and in general include the surface-active clays, preferably such clays which have been prepared by acid extraction or otherwise so as to remove all constituents except the active hydrosilicates. Natural surface-active clays are exemplified in fullers' earth, Floridin, bentonite and the like. Examples of the preferred acid-activated clays are those products sold under the trade names of "Tonsil," "Retrol," "Frankonit," "Superfiltrol" and "Filtrol."

Rosin compounds suitable for use as starting materials in this process include in general those substances derived from the gymnosperm trees which are characterized by the trialicyclic nucleus of rosin. The rosin nuclei in the rosin compounds employed in the process of this invention may be hydrogenated, dehydrogenated or may occur in disproportionated mixture. The rosin compounds suitable for use as starting materials in the process of this invention include rosin materials not containing any carboxyl groups, acidic rosin materials containing free carboxylic acid groups and acidic rosin materials, the carboxyl groups of which have been removed or blocked, as by esterification. Examples of rosin materials not containing carboxylic groups include rosin oils, decarboxylated rosin and the fossil resins. Examples of acidic rosin materials which are adapted for use in the process of this invention include rosin, hydrogenated, dehydrogenated and disproportionated rosin or the acids characteristic thereof, such, for example, as abietic, pimaric, sapinic and the like acids. Further, the resinous materials derived from tall oil contain large quantities of compounds having the rosin nucleus and may be used in place of rosin. These acidic materials may be preliminarily treated so as to remove or block the carboxylic groups, for instance, by any decarboxylating process or by esterification with an alcohol such as methyl, ethyl, propyl and butyl alcohols, as well as other alcoholic substances such as the polyhydric alcohols. Examples of suitable esters are the methyl, ethyl, propyl, butyl and like esters of abietic, dihydroabietic, dehydroabietic, pimaric and sapinic acids, or mixtures of these acids. Hereinafter all the foregoing and allied substances will be designated "rosin compounds."

Coming now to the alkyl-yielding compounds which are to be condensed with the rosin compounds, these may conveniently be alcohols (primary, secondary or tertiary); alkenes; cycloalkanes; or alkyl halides. These compounds may contain varying numbers of carbon atoms, depending upon the characteristics desired in the final product. Especially desirable products are obtained by the employment of alkyl-yielding compounds containing upwards of 8 carbon atoms, as the resulting condensation products are admirably adapted for lubricant-blending and (when sulfonated or phosphonated) for surface-active agents in aqueous media. Of the several types of alkyl-yielding agents, the olefins and alcohols are preferred, as these materials react smoothly, do not produce corrosive fumes, and are cheaply and readily procurable. Suitable alcohols may be chosen from the lower alcohols such as methyl, ethyl, isopropyl and the like, but more useful products are obtained from alcohols containing preferably upwards of 8 carbon atoms such as octyl, 2-ethyl hexyl, lauryl, myristyl, cetyl and like alcohols, or mixtures of such alcohols formed by the reduction of the fatty acids derived from various oils, such as coconut oil, babassu oil, soyabean oil and the like. Suitable alkenes and cycloalkanes are those containing preferably upwards of 8 carbon atoms, such as octylene, diisobutylene, ethylcyclohexane, dodecylene and the like, but lower homologues may be used if desired. The alkenes may be obtained by dehydration of corresponding alcohols. Both the alkenes and cycloalkanes may be derived from petroleum products or from the cracking, polymerization and dehydrogenation products of petroleum and petroleum gases. Suitable alkyl halides for furnishing the alkyl constituent in the reaction above described include alkyl chlorides preferably containing upwards of 8 carbon atoms, such as the octyl, nonyl, decyl, undecyl, lauryl and myristyl chlorides, although lower chlorides may be used if it is desired to produce products containing lower alkyl groups. Instead of the pure compounds, mixtures of suitable chlorides may be employed, such as the mixtures of chlorides obtainable by the chlorination of petroleum distillates containing alkyl chains of the requisite length. Instead of chlorides, obviously other corresponding halides may be used.

The condensation of the rosin compound and the alkyl-yielding agent is brought about by mixing these reactants together with the hydrosilicate catalyst, and heating to moderately elevated temperatures between about 75° C. and about 225° C. for between about 1 and about 8 hours. The amount of alkyl-yielding agent will vary, depending on the characteristics desired in the final condensation product. In general between about 1 mol and 3 mols of alkyl-yielding agent will be employed for each mol of the rosin compound with which it is to be condensed. If it is found convenient, the reactants may be diluted with a suitable inert solvent such as a petroleum solvent. The pressures under which the reaction is carried out will of course be adjusted to the characteristics of the materials being reacted, being raised to above atmospheric pressure, if necessary, to prevent the escape of the essential reactants. Likewise, the reaction may be carried out under a reflux condenser, which may optionally be equipped with a trap to prevent the return of undesired end products such as water. The reactions occurring during the condensation are of an obscure nature and are believed to consist principally of the addition of the alkyl groups from the alkyl-yielding substance to the rosin nucleus. This is indicated by the relatively low boiling points and oily character of the products. However, a certain amount of rearrangement may take place within the rosin nucleus itself, and certain minimal quantities of rosin may be condensed. Accordingly, the applicant does not wish to be bound by any particular theory as to the course of the condensation reaction and the products resulting will hereinafter be designated condensation products without indicating what the exact nature of these products may be. In general these products will have the same properties as were observed in the condensation products disclosed in the above-mentioned applications of Price and May, being suitable for additives to lubricating compositions and being susceptible of sulfonation, phosphonation, etc. to yield surface-active agents which may be used as detergents, scouring agents, wetting agents and the like, according to the nature of the materials condensed and the conditions of condensation and sulfonation.

The process is admirably adapted to continuous operation since the catalyst (activated clay) is a solid and readily separable from the reacting materials. Thus, the catalyst may be suspended in a flowing stream of the rosin material and alkyl-yielding agent, and the suspension passed through a heated reaction column to bring about the condensation of the rosin material and alkyl-yielding agent. The catalyst may be filtered from the reaction mixture emerging from the column, and recycled.

With the above general discussion in mind there are given herewith specific examples of the practice of this invention. All parts given are by weight.

EXAMPLE I

Caprylated rosin oil 30 parts (1 mol) of a neutral rosin oil, 13 parts (1 mol) of capryl alcohol and 2.5 parts of the commercial activated earth known as "Tonsil" were heated and stirred together for 4 hours at temperatures ranging between 160° and 175° C. A reflux condenser was provided for returning the unreacted materials distilled from the reaction mixture, which reflux condenser was equipped with a water trap to avoid the return of the water split out from the reactants. Thereafter the reaction mixture was filtered from the catalyst while still warm and consisted of a pale yellow viscous oil. This oil was then subjected to fractional distillation and a small amount of lower boiling material distilled off at about 120° C., leaving 36 parts of the alkylated product.

EXAMPLE II

Caprylated methyl abietate 32 parts (1 mol) of methyl abietate and 13 parts (1 mol) of capryl alcohol were heated and refluxed for 4 hours in the presence of 2.5 parts of "Tonsil" at temperatures ranging from 135° to 160° C. The reaction mixture was then separated from the "Tonsil" and subjected to fractional distillation as described above in Example I. The product consisted of 30 parts of a pale yellow oil.

EXAMPLE III

Caprylated methyl dehydroabietate 32 parts (1 mol) of methyl dehydroabietate (Galex methyl ester manufactured by the G. & A. Laboratories, Savannah, Ga.), 13 parts (1 mol) of capryl alcohol, and 2.5 parts of a commercial activated bleaching clay ("Superfiltrol" manufactured by the Filtrol Corporation of California) were heated for 6½ hours with reflux at temperatures ranging between 135 and 160° C. The reaction mixture was filtered and subjected to fractional distillation as described above in Example I. 35 parts of a pale yellow oily condensation product were recovered.

EXAMPLE IV

*Caprylated methyl dehydroabietate*

30 parts (1 mol) of dehydroabietic acid ("Galex," a product manufactured by the G. & A. Laboratories) and 13 parts of capryl alcohol were refluxed for 6 hours at temperatures ranging between 170 and 185° C. in the presence of 2.5 parts of an activated hydrosilicate. The reaction mixture was thereafter worked up exactly as described in the previous examples and there were recovered 21 parts of a dark red oil which was completely soluble in 10% sodium hydroxide solution.

EXAMPLE V

*Caprylated rosin oil*

30 parts (1 mol) of a rosin oil having an acid number less than 5, 13 parts of capryl alcohol and 2.5 parts of an activated hydrosilicate were refluxed for 6 hours. The reaction product was filtered to remove the activated hydrosilicate, leaving a pale yellow oil.

EXAMPLE VI

*Alkylated methyl abietate*

32 parts (1 mol) of methyl abietate and 25 parts of a mixture of terminally-unsaturated mono-olefinic compounds derived from petroleum and having an average molecular weight corresponding to about 12 carbon atoms were refluxed for 8 hours with 2.5 parts of "Superfiltrol" at temperatures ranging between 170° and 220° C. The reaction mixture was filtered to remove the "Superfiltrol" and then subjected to distillation at 170° C. to remove a small amount of low boiling material, leaving a condensation product consisting of a red oil.

EXAMPLE VII

*n-Decylated rosin oil*

30 parts (1 mol) of neutral rosin oil, 15 parts (1 mol) of n-decanol and 2.5 parts of "Superfiltrol" were refluxed for 4½ hours at temperatures ranging between 220° and 228° C. Upon working up the reaction mixture as described in Example I there were obtained 36 parts of a pale yellow, fluorescent oil.

EXAMPLE VIII

*Octylated rosin oil*

11 parts of octylene-1 were substituted for the 15 parts of n-decanol in the procedure of Example VII. The resultant condensation product obtained consisted of a pale yellow, viscous oil.

EXAMPLE IX

*Octylated methyl dehydroabietate*

157 parts (1 mol) of methyl dehydroabietate ("Galex methyl ester"), 56 parts (1.3 mols) of octylene and 20 parts of "Superfiltrol" were heated in an autoclave provided with a mechanical stirrer to a temperature of 130° C. for 7 hours. During the reaction the gauge pressure inside the autoclave reached a maximum of 45 lbs. per sq. in. Thereafter the reaction mixture was cooled, removed from the autoclave and filtered to remove the "Superfiltrol." There resulted 180 grams of a mixture of the condensation products and unreacted materials, which mixture was a dark red oil possessing a dark greenish fluorescence. This mixture was then distilled, yielding a light yellow, viscous oil distilling in the range between 152° and 172° C., under 1 mm. pressure, leaving behind a solid residue.

EXAMPLE X

*Condensate of rosin oil and diisobutylene*

60 parts of a rosin oil having less than 5% free rosin acids and 22 parts of diisobutylene were refluxed for 4 hours in the presence of 5 parts of "Superfiltrol." Thereafter the reaction mixture was filtered to remove the "Superfiltrol," leaving 73 parts of a straw-colored oil.

EXAMPLE XI

*Dodecylated rosin oil*

30 parts of a neutral rosin oil, 20 parts of dodecyl chloride and 3 parts "Superfiltrol" were stirred and refluxed at temperatures between 225° and 230° C. for 5 hours. HCl was evolved and absorbed in KOH solution. There resulted 41 grams of a pale yellow, fluorescent, oily condensation product.

EXAMPLE XII

*Alkylated methyl abietate*

A petroleum fraction consisting predominantly of 12 carbon atom chains was chlorinated at temperatures between 90° and 100° C. to the extent of about 25%. 88 parts of the chlorinated petroleum fraction prepared as just described and 30 parts of methyl abietate were mixed with 3 parts of "Superfiltrol" and the mixture was refluxed for 6 hours at temperatures ranging between 225° and 230° C. HCl was evolved during the reaction, and absorbed as in Example XI. The reaction mixture was then distilled and 54 parts of unreacted hydrocarbons came over in the range between 190° and 220° C., leaving behind 53 parts of an oily condensation product.

EXAMPLE XIII

*Alkylated methyl dihydroabietate*

30 parts of methyl dihydroabietate ("Galex methyl ester") were substituted for the methyl abietate in the procedure of Example XII. There were obtained 43 parts of an oily condensation product.

EXAMPLE XIV

*2 Ethyl hexyl derivative of rosin oil*

30 parts (1 mol) of a rosin oil having an acid number less than 5, 13 parts (1 mol) of 2 ethyl hexanol and 3 parts of "Superfiltrol" were refluxed with stirring at temperatures ranging between 130° and 140° C. for 4½ hours. The reaction mixture was filtered while still hot to remove the "Superfiltrol." The filtered mixture was subjected to distillation up to a temperature of 200° C. to remove the volatile unreacted material, leaving behind 32 parts of a light yellow, mobile, oily condensation product.

EXAMPLE XV

*Caprylated diethylene glycol diabietate*

34 parts of diethylene glycol diabietate (Flexalyn, a product manufactured by the Hercules Powder Co.) 130 parts of capryl alcohol and 6 parts of activated clay (Superfiltrol) were mixed and refluxed at temperatures ranging between 130° and 140° C. for 6 hours. A trap was provided to prevent the return of water with the reflux. The reaction mixture was then filtered to remove the activated clay and subjected to vacuum distillation to remove the excess unreacted material. 43 parts of a crude product were obtained.

EXAMPLE XVI

Caprylated abietic acid 20 parts (1 mol) of pure abietic acid prepared as described in the Journal of the American Chemical Society, 44, 1333 (1922) were dissolved in 100 parts (9 mols) of capryl alcohol, and 6 parts of "Superfiltrol" were added to the solution. The mixture was then refluxed under a column provided with a water trap. At the end of 10 hours' refluxing, the theoretical amount of water had been eliminated and caught in the trap, and the reaction mixture was cooled and filtered to remove the "Superfiltrol." The filtered mixture was distilled to remove the excess octylene (derived by dehydration of the capryl alcohol), leaving behind 23 parts of an oily residue. This residue was subjected to vacuum distillation at 3 mm. pressure, yielding 5 parts of a liquid fraction coming over in the range 60°–190° C.; 6 parts of a plastic resin coming over in the range 192°–210° C. having an acid number of 134 and a neutral equivalent of 420 (neutral equivalent for caprylated abietic acid is 414); and 5 parts of a plastic resin coming over in the range 210°–220° C.

EXAMPLE XVII

Tall oil alkylation 50 parts of a tall oil, the acid groups of which had been esterified with glycerin, were mixed with 100 parts of capryl alcohol and 6 parts of "Superfiltrol." The mixture was mechanically stirred and refluxed for 10 hours at 180° C. under a condenser provided with a water trap. Thereafter, the mixture was filtered to remove the "Superfiltrol" and evaporated at atmospheric pressure up to a temperature of 230° C. to strip off the unreacted material, leaving a residue of 53 parts of a mobile oil.

From a consideration of the foregoing examples, it will be seen that this invention provides a process for condensing rosin materials with alkyl-yielding agents which does not involve the use of corrosive chemicals or the loss of any of the reactants, since the catalyst may be recovered in its original, unchanged form by mere mechanical separation. Further, in most cases the process may be carried out in apparatus of the ordinary and cheap construction materials which need have no particular resistance to corrosion. Still further the reactions proceed smoothly and result in high yields of homogeneous products suitable for many technical applications.

I therefore claim:

1. A process of producing an alkylated rosin compound which comprises alkylating, in the presence of an activated hydrosilicate catalyst, a rosin compound selected from the group consisting of rosin, hydrogenated rosin, dehydrogenated rosin, disproportionated rosin, abietic acid, pimaric acid, sapinic acid, and the esters and decarboxylation products thereof, with an alkyl-yielding compound capable of alkylating said rosin compounds.

2. A process of producing an alkylated rosin compound which comprises alkylating, in the presence of an activated hydrosilicate catalyst, a rosin compound selected from the group consisting of rosin, hydrogenated rosin, dehydrogenated rosin, disproportionated rosin, abietic acid, pimaric acid, sapinic acid, and the esters and decarboxylation products thereof, with a monohydric alcohol.

3. A process of producing an alkylated rosin compound which comprises alkylating, in the presence of an activated hydrosilicate catalyst, a rosin compound selected from the group consisting of rosin, hydrogenated rosin, dehydrogenated rosin, disproportionated rosin, abietic acid, pimaric acid, sapinic acid, and the esters and decarboxylation products thereof, with an olefin.

4. A process of producing an alkylated rosin compound which comprises alkylating, in the presence of an activated hydrosilicate catalyst, a rosin compound selected from the group consisting of rosin, hydrogenated rosin, dehydrogenated rosin, disproportionated rosin, abietic acid, pimaric acid, sapinic acid, and the esters and decarboxylation products thereof, with an alkyl halide.

5. A process of producing an alkylated rosin compound which comprises alkylating, in the presence of an activated hydrosilicate catalyst, a rosin compound selected from the group consisting of rosin, hydrogenated rosin, dehydrogenated rosin, disproportionated rosin, abietic acid, pimaric acid, sapinic acid, and the esters and decarboxylation products thereof, with an alkyl-yielding compound containing at least 8 carbon atoms and being capable of alkylating said rosin compound.

6. A process of producing an alkylated rosin compound which comprises alkylating, in the presence of an activated hydrosilicate catalyst, a rosin compound selected from the group consisting of rosin, hydrogenated rosin, dehydrogenated rosin, disproportionated rosin, abietic acid, pimaric acid, sapinic acid, and the esters and decarboxylation products thereof, with a monohydric alcohol containing at least 8 carbon atoms.

7. A process of producing an alkylated rosin compound which comprises alkylating, in the presence of an activated hydrosilicate catalyst, a rosin compound selected from the group consisting of rosin, hydrogenated rosin, dehydrogenated rosin, disproportionated rosin, abietic acid, pimaric acid, sapinic acid, and the esters and decarboxylation products thereof, with an olefin containing at least 8 carbon atoms.

8. A process of producing an alkylated rosin compound which comprises alkylating, in the presence of an activated hydrosilicate catalyst, a rosin compound selected from the group consisting of rosin, hydrogenated rosin, dehydrogenated rosin, disproportionated rosin, abietic acid, pimaric acid, sapinic acid, and the esters and decarboxylation products thereof, with an alkyl halide containing at least 8 carbon atoms.

9. A process of producing alkylated rosin which comprises alkylating rosin, in the presence of an activated hydrosilicate catalyst, with an alkyl-yielding compound capable of alkylating the rosin.

10. A process of producing an alkylated rosin which comprises alkylating rosin, in the presence of an activated hydrosilicate catalyst, with a monohydric alcohol containing at least 8 carbon atoms.

11. A process of producing an alkylated rosin which comprises alkylating rosin, in the presence of an activated hydrosilicate catalyst, with an olefin containing at least 8 carbon atoms.

12. A process of producing an alkylated rosin oil which comprises alkylating rosin oil, in the presence of an activated hydrosilicate catalyst, with a monohydric alcohol containing at least 8 carbon atoms.

DONALD PRICE.